United States Patent
Knauerhase et al.

(10) Patent No.: US 7,415,708 B2
(45) Date of Patent: Aug. 19, 2008

(54) VIRTUAL MACHINE MANAGEMENT USING PROCESSOR STATE INFORMATION

(75) Inventors: Robert C. Knauerhase, Portland, OR (US); Vijay Tewari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1069 days.

(21) Appl. No.: 10/609,202

(22) Filed: Jun. 26, 2003

(65) Prior Publication Data

US 2004/0268347 A1 Dec. 30, 2004

(51) Int. Cl.
G06F 9/455 (2006.01)
G06F 9/46 (2006.01)

(52) U.S. Cl. .............................. 718/1; 718/104; 718/105
(58) Field of Classification Search ............... 718/1–108
See application file for complete search history.

(56) References Cited

U.S. PATENT DOCUMENTS

| | | | |
|---|---|---|---|
| 4,037,214 A | 7/1977 | Birney et al. | |
| 4,162,536 A | 7/1979 | Morley | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,521,852 A | 6/1985 | Guttag | |
| 4,571,672 A | 2/1986 | Hatada et al. | |
| 4,759,064 A | 7/1988 | Chaum | |
| 4,795,893 A | 1/1989 | Ugon | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,255,379 A | 10/1993 | Melo | |
| 5,293,424 A | 3/1994 | Hotley et al. | |
| 5,317,705 A | 5/1994 | Gannon et al. | |
| 5,319,760 A | 6/1994 | Mason et al. | |

(Continued)

FOREIGN PATENT DOCUMENTS

| | | |
|---|---|---|
| DE | 4217444 | 12/1992 |
| EP | 0473913 | 3/1992 |
| EP | 0600112 | 6/1994 |
| EP | 0930567 | 7/1999 |
| EP | 1030237 | 8/2000 |

(Continued)

OTHER PUBLICATIONS

Berg, Cliff, "How Do I Create a Signed Applet?", *Dr. Dobb's Journal*, (Aug. 1997),1-9.

(Continued)

*Primary Examiner*—Meng-Ai An
*Assistant Examiner*—Abdullah Al Kawsar
(74) *Attorney, Agent, or Firm*—Blakely, Sokoloff, Taylor & Zafman LLP

(57) ABSTRACT

A method, system, and apparatus are provided for virtual machine management. According to one embodiment, processor state information associated with a processor is evaluated, and the processor state information is used to manage one or more virtual machines.

10 Claims, 7 Drawing Sheets

U.S. PATENT DOCUMENTS

| | | | | |
|---|---|---|---|---|
| 5,386,552 | A | 1/1995 | Garney | |
| 5,421,006 | A | 5/1995 | Jablon et al. | |
| 5,434,999 | A | 7/1995 | Goire et al. | |
| 5,437,033 | A * | 7/1995 | Inoue et al. | 714/10 |
| 5,442,645 | A | 8/1995 | Ugon et al. | |
| 5,455,909 | A | 10/1995 | Blomgren et al. | |
| 5,459,867 | A | 10/1995 | Adams et al. | |
| 5,459,869 | A | 10/1995 | Spilo | |
| 5,473,692 | A | 12/1995 | Davis | |
| 5,479,509 | A | 12/1995 | Ugon | |
| 5,488,716 | A * | 1/1996 | Schneider et al. | 714/10 |
| 5,504,922 | A | 4/1996 | Seki et al. | |
| 5,511,217 | A | 4/1996 | Nakajima et al. | |
| 5,522,075 | A | 5/1996 | Robinson et al. | |
| 5,528,231 | A | 6/1996 | Patarin | |
| 5,530,860 | A * | 6/1996 | Matsuura | 718/105 |
| 5,533,126 | A | 7/1996 | Hazard | |
| 5,566,323 | A | 10/1996 | Ugon | |
| 5,568,552 | A | 10/1996 | Davis | |
| 5,606,617 | A | 2/1997 | Brands | |
| 5,615,263 | A | 3/1997 | Takahashi | |
| 5,628,022 | A | 5/1997 | Ueno et al. | |
| 5,657,445 | A | 8/1997 | Pearce | |
| 5,717,903 | A | 2/1998 | Bonola | |
| 5,720,609 | A | 2/1998 | Pfefferle | |
| 5,721,222 | A | 2/1998 | Bernstein et al. | |
| 5,729,760 | A | 3/1998 | Poisner | |
| 5,737,604 | A | 4/1998 | Miller et al. | |
| 5,737,760 | A | 4/1998 | Grimmer, Jr. et al. | 711/163 |
| 5,757,919 | A | 5/1998 | Herbert et al. | |
| 5,764,969 | A | 6/1998 | Kahle | |
| 5,796,835 | A | 8/1998 | Saada | |
| 5,796,845 | A | 8/1998 | Serikawa et al. | |
| 5,805,712 | A | 9/1998 | Davis | |
| 5,825,875 | A | 10/1998 | Ugon | |
| 5,835,594 | A | 11/1998 | Albrecht et al. | |
| 5,844,986 | A | 12/1998 | Davis | |
| 5,852,717 | A | 12/1998 | Bhide et al. | |
| 5,854,913 | A | 12/1998 | Goetz et al. | |
| 5,867,577 | A | 2/1999 | Patarin | |
| 5,872,994 | A | 2/1999 | Akiyama et al. | |
| 5,890,189 | A | 3/1999 | Nozue et al. | |
| 5,900,606 | A | 5/1999 | Rigal | |
| 5,901,225 | A | 5/1999 | Ireton et al. | |
| 5,903,752 | A | 5/1999 | Dingwall et al. | |
| 5,937,063 | A | 8/1999 | Davis | |
| 5,953,502 | A | 9/1999 | Helbig, Sr. | |
| 5,970,147 | A | 10/1999 | Davis et al. | |
| 5,978,481 | A | 11/1999 | Ganesan et al. | |
| 5,987,557 | A | 11/1999 | Ebrahim | |
| 6,014,745 | A | 1/2000 | Ashe | |
| 6,055,637 | A | 4/2000 | Hudson et al. | |
| 6,058,478 | A | 5/2000 | Davis | |
| 6,061,794 | A | 5/2000 | Angelo | |
| 6,075,938 | A * | 6/2000 | Bugnion et al. | 703/27 |
| 6,085,296 | A | 7/2000 | Karkhanis et al. | |
| 6,092,095 | A | 7/2000 | Maytal | |
| 6,101,584 | A | 8/2000 | Satou et al. | |
| 6,115,816 | A | 9/2000 | Davis | |
| 6,125,430 | A | 9/2000 | Noel et al. | |
| 6,148,379 | A | 11/2000 | Schimmel | |
| 6,158,546 | A | 12/2000 | Hanson et al. | |
| 6,175,925 | B1 | 1/2001 | Nardone | |
| 6,178,509 | B1 | 1/2001 | Nardone et al. | |
| 6,182,089 | B1 | 1/2001 | Ganapathy et al. | |
| 6,192,455 | B1 | 2/2001 | Bogin et al. | |
| 6,205,550 | B1 | 3/2001 | Nardone et al. | |
| 6,212,635 | B1 | 4/2001 | Reardon | |
| 6,222,923 | B1 | 4/2001 | Schwenk | |
| 6,249,872 | B1 | 6/2001 | Wildgrube et al. | 713/200 |
| 6,252,650 | B1 | 6/2001 | Nakamura | |
| 6,269,392 | B1 | 7/2001 | Cotichini et al. | |
| 6,272,533 | B1 | 8/2001 | Browne et al. | 709/213 |
| 6,272,637 | B1 | 8/2001 | Little et al. | 713/194 |
| 6,282,651 | B1 | 8/2001 | Ashe | |
| 6,282,657 | B1 | 8/2001 | Kaplan et al. | |
| 6,292,874 | B1 | 9/2001 | Barnett | 711/153 |
| 6,301,646 | B1 | 10/2001 | Hostetter | |
| 6,308,270 | B1 | 10/2001 | Guthery | |
| 6,314,409 | B2 | 11/2001 | Schneck et al. | |
| 6,321,314 | B1 | 11/2001 | Van Dyke | |
| 6,330,670 | B1 | 12/2001 | England et al. | |
| 6,339,815 | B1 | 1/2002 | Feng | |
| 6,339,816 | B1 | 1/2002 | Bausch | |
| 6,357,004 | B1 | 3/2002 | Davis | |
| 6,363,485 | B1 | 3/2002 | Adams | |
| 6,374,286 | B1 | 4/2002 | Gee et al. | |
| 6,374,317 | B1 | 4/2002 | Ajanovic et al. | 710/105 |
| 6,378,072 | B1 | 4/2002 | Collins et al. | |
| 6,389,537 | B1 | 5/2002 | Davis et al. | |
| 6,397,242 | B1 | 5/2002 | Devine et al. | |
| 6,412,035 | B1 | 6/2002 | Webber | |
| 6,421,702 | B1 | 7/2002 | Gulick | |
| 6,435,416 | B1 | 8/2002 | Slassi | |
| 6,445,797 | B1 | 9/2002 | McGough et al. | |
| 6,463,535 | B1 | 10/2002 | Drews et al. | |
| 6,463,537 | B1 | 10/2002 | Tello | |
| 6,496,847 | B1 * | 12/2002 | Bugnion et al. | 718/1 |
| 6,499,123 | B1 | 12/2002 | McFarland et al. | |
| 6,505,279 | B1 | 1/2003 | Phillips et al. | |
| 6,507,904 | B1 | 1/2003 | Ellison et al. | |
| 6,535,988 | B1 | 3/2003 | Poisner | |
| 6,557,104 | B2 | 4/2003 | Vu et al. | |
| 6,587,937 | B1 * | 7/2003 | Jensen et al. | 711/173 |
| 6,633,963 | B1 | 10/2003 | Ellison et al. | |
| 6,633,981 | B1 | 10/2003 | Davis | |
| 6,795,966 | B1 * | 9/2004 | Lim et al. | 718/1 |
| 6,804,630 | B2 * | 10/2004 | Lee et al. | 702/186 |
| 6,961,941 | B1 * | 11/2005 | Nelson et al. | 719/319 |
| 7,137,016 | B2 * | 11/2006 | Nalawadi et al. | 713/300 |
| 7,222,203 | B2 * | 5/2007 | Madukkarumukumana et al. | 710/260 |
| 2001/0021969 | A1 | 9/2001 | Burger et al. | |
| 2001/0027527 | A1 | 10/2001 | Khidekel et al. | |
| 2001/0037450 | A1 | 11/2001 | Metlitski et al. | |
| 2002/0013802 | A1 * | 1/2002 | Mori et al. | 718/1 |
| 2003/0018892 | A1 | 1/2003 | Tello | |
| 2003/0037089 | A1 * | 2/2003 | Cota-Robles et al. | 709/1 |
| 2004/0128670 | A1 * | 7/2004 | Robinson et al. | 718/1 |

FOREIGN PATENT DOCUMENTS

| | | |
|---|---|---|
| EP | 1146715 | 10/2001 |
| JP | 2000076139 | 3/2000 |
| WO | WO9729567 | 8/1997 |
| WO | WO9834365 | 8/1998 |
| WO | WO9844402 | 10/1998 |
| WO | WO9905600 | 2/1999 |
| WO | WO9957863 | 11/1999 |
| WO | WO0062232 | 10/2000 |
| WO | WO0127723 | 4/2001 |
| WO | WO0127821 | 4/2001 |
| WO | WO0175565 | 10/2001 |
| WO | WO0175595 | 10/2001 |
| WO | WO9909482 | 1/2002 |
| WO | WO0217555 | 2/2002 |
| WO | WO0175564 | 10/2002 |
| WO | WO02086684 | 10/2002 |

OTHER PUBLICATIONS

Brands, Stefan, "Restrictive Blinding of Secret-Key Certificates", *Springer-Verlag XP002201306*, (1995),Chapter 3.

Chen, Andrew A., et al., "Safe and Protected Execution for the Morph/AMRM Reconfigurable Processor", *7th Annual IEEE Sym-*

*posium, FCCM '99 Proceedings*, XP010359180, ISBN 0-7695-0375-6, Los Alamitos, CA, (Apr. 21, 1999),209-221.

Compaq Computer Corporation, et al., "Trusted Computing Platform Alliance (TCPA) Main Specification Version 1.1a", (Dec. 2001),1-321.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Goldberg, Robert P., "Survey of Virtual Machine Research", *Computer Magazine*, (Jun. 1974),34-35.

Gong, Li, et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-97.

IBM, "Information Display Technique for a Terminiate Stay Resident Program IBM Technical Disclosure Bulletin", TDB-ACC-No. NA9112156, vol. 34, Issue 7A, (Dec. 1, 1991),156-158.

Intel, "Intel386 DX Microprocessor 32-Bit CHMOS Microprocessor With Integrated Memory Management", (1995),5-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614,(Mar. 1999).

Motorola, "M68040 User's Manual", (1993),1-1 to 8-32.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999), 185-196.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering*, University of California, San Diego, La Jolla, CA, (Nov. 2001).

* cited by examiner

VIRTUAL MACHINE MANAGEMENT USING PROCESSOR STATE INFORMATION

BACKGROUND OF THE INVENTION

1. Field of the Invention

The invention generally relates to virtual machine management, and more particularly to efficient scheduling of virtual machines using processor state information.

2. Description of the Related Art

Virtualization of machine resources has been of significant interest for some time; however, with processors becoming more diverse and complex, such as processors that are deeply pipelined/super pipelined, hyperthreaded, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be partitioned, such that the underlying hardware of the machine appears as one or more independently operating virtual machines (VM). Typically, a Virtual Machine Monitor (VMM) may be a thin layer of software running on a computer and presenting to other software an abstraction of one or more VMs. Each VM, on the other hand, may function as a self-contained platform, running its own operating system (OS), or a copy of the OS, and/or a software application. Software executing within a VM is collectively referred to as "guest software".

A typical VMM, which is considered the host of the VMs, may enhance performance of a VM by permitting direct access to the underlying physical machine in some situations. This may be especially appropriate when an operation is being performed in non-privileged mode in the guest software, which limits access to the physical machine or when operations will not make use of hardware resources in the physical machine to which the VMM seeks to retain control. The VMM may swap guest software state in and out of the processor, devices, memory, and the registers of the physical machine, while the processor may swap some state in and out during transitions between a VM and the VMM.

The conventional VM/VMM architecture rely on time-slicing between various VMs according to round-robin or other predetermined priority-based schemes. For example, a pre-determined allocated time period (or time quanta) for each VM may be stored in the memory to direct the VMM to periodically switch between the VMs based on the previously allocated time period for each VM. Round-robin or pre-determined priority-based schemes inherently fail to provide the VMM any control or authority regarding managing the VMs, as the VMM is limited to following the pre-determined plan or scheme. Stated differently, methods, apparatus, and systems, available today, are limited to round-robin or time-slicing of the VMs, and do not provide the VMM to intelligently swap between the VMs using processor state information including characteristics and/or history of the processor, characteristics and/or history of the guest software, characteristics and/or history of the VMs, and characteristics and/or history of the machine.

One solution proposed by VMWare, Inc. (VMWare) of Palo Alto, Calif., relies on OS thread-scheduling to use the VMM to swap between the VMs. The VMWare solution provides for running two or more operating systems, such as Linux and Microsoft Windows, on a single machine, using the facilities provided by the operating system that runs on the underlying hardware. This system relies on the OS scheduling policy to schedule the VMs. However, virtualization based on OS scheduling (for scheduling the VMs) is performed without the knowledge of the processor state or even the processor. Furthermore, as the VM functionality moves into hardware, the OS-based solutions that attempt to optimize context-switch intervals for processors will be less aware or even completely unaware of the processors and the context-switching for the processors. Furthermore, the OS-based solutions not only do not accommodate characteristics of different processors, but also do not accommodate characteristics of processors of a single family.

Neither the OS-based virtualization solution proposed by VMWare nor any of the other conventional solutions employ software and/or hardware-based state management mechanism to consider the processor state information to intelligently swap between the VMs in order to significantly improve machine performance, and to accommodate rapidly changing processor architecture and characteristics.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
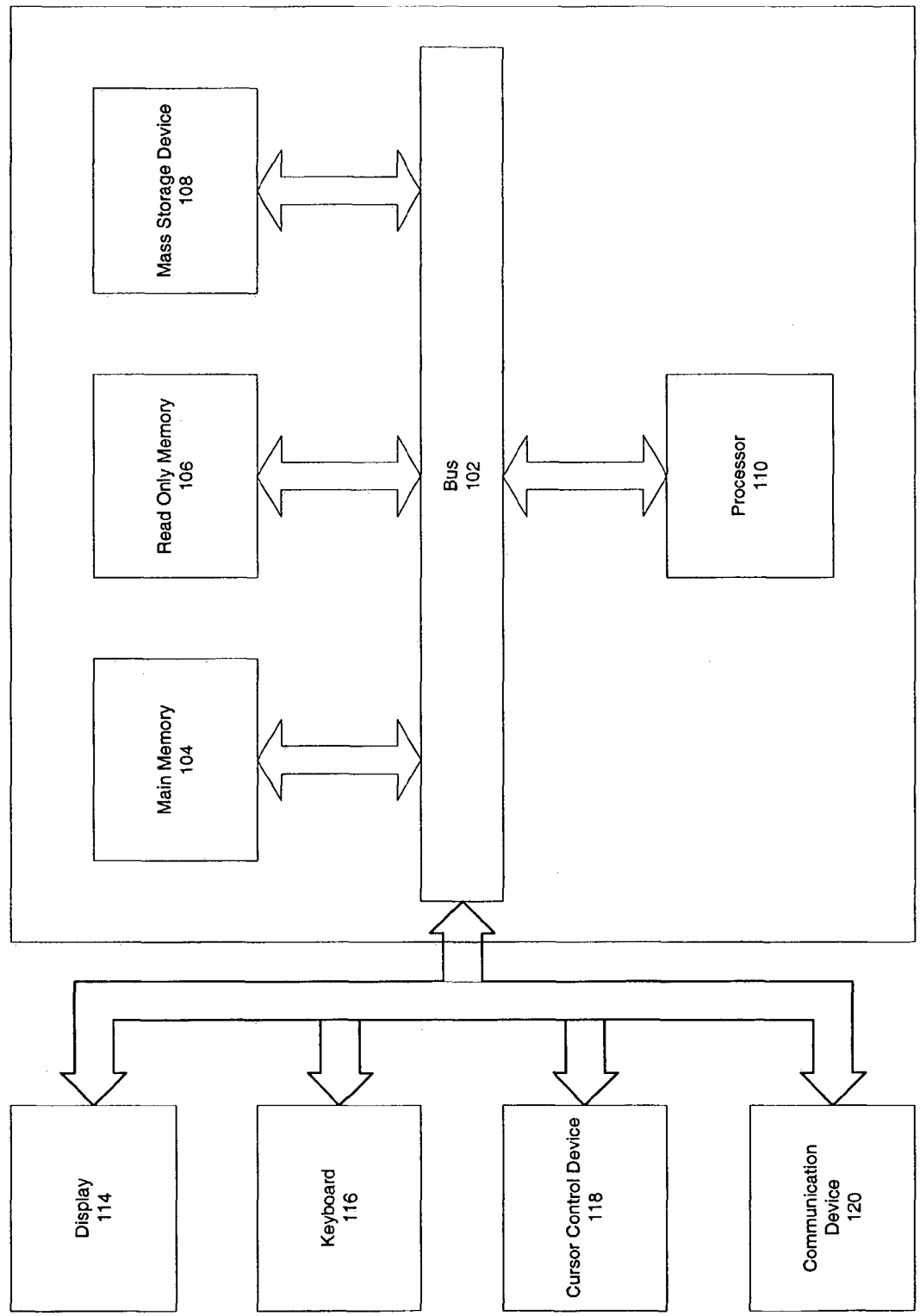
FIG. 1 is a block diagram illustrating an embodiment of a computer system.

A method and apparatus are described for virtual machine management. Broadly stated, embodiments of the present invention provide for efficient scheduling of virtual machines using processor state information.

A system, apparatus, and method are provided for managing virtual machines using processor state information and other related information. According to one embodiment, a software and/or hardware-based state management unit is provided to monitor the state of the processor. The information relating to the processor may be gathered and evaluated. According to one embodiment, based on the processor state information gathered, a first virtual machine's (VM) time for performing a certain task may be extended by allowing the first VM to run for a longer period of time than its pre-assigned time period (or time quanta) based on the central processing unit's (CPU) time allocation. According to another embodiment, the time period of the first VM may be suspended early and the first VM may be switched a second VM to allow the second VM to execute on the CPU. According to one embodiment, the state management unit may continue to gather processor state information, until the processor state information triggers early suspension or further extension of the time quanta allocated to each of the VMs.

According to one embodiment, virtual machine management using the processor state information may be performed with multiple processors. Each of the multiple processors may have their own corresponding processor state, which may be continually monitored by the state management of the Virtual Machine Manager (VMM). Furthermore, according to one embodiment, virtual machine management using the processor state information may also be performed using one or more hyperthreaded processors, with each hyperthreaded processor having multiple threads on one or more logical processors. According to one embodiment, processor state of a single hyperthreaded processor may be monitored. According to another embodiment, multiple processor states may be monitored, where each of the multiple processor states corresponds to each of the multiple hyperthreaded processors. A typical hyperthreaded processor may include a single physical processor with multiple logical processors each sharing the physical execution resources.

Embodiments of the present invention may be implemented as software or hardware or as a combination thereof. For example, according to one embodiment, the VMM with state management may be implemented as a software application, or device driver, or as part of the operating system, or as part of or embedded in a chipset or microprocessor, or as a combination thereof. Furthermore, for example, hardware implementation of the embodiments of the present invention may help continually monitor the processor state of a processor in parallel with execution of the application software, efficiently providing processor state information resulting in decisions to enhance the performance of the VMM.

Some portions of the detailed descriptions that follow may be presented in terms of algorithms and symbolic representations of operations on data bits within a computer memory. These algorithmic descriptions and representations may be the means used by those skilled in the data processing arts to most effectively convey the substance of their work to others skilled in the art. Typically, as here, an algorithm is conceived to be a self-consistent sequence of steps leading to a desired result. The steps are those requiring physical manipulations of physical; quantities. Usually, though not necessarily, these quantities take the form of electrical or magnetic signals capable of being stored, transferred, combined,-compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the present invention include various steps, which will be described below. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The embodiments of the present invention may relate to apparatus for performing the operations herein. This apparatus may be specially constructed for the required purposes, or it may comprise a general-purpose computer selectively activated or reconfigured by a computer program stored in the computer. Such a computer program may be stored or provided as a computer program product that may include a machine-readable medium, having stored thereon instructions, which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, a carrier wave or other propagation medium shall be regarded as comprising a machine-readable medium for the purpose of the present specification.

In the following description, for the purposes of explanation, numerous specific details are set forth in order to provide a thorough understanding of the present invention. It will be apparent, however, to one skilled in the art, based on the disclosure provided herein, that the embodiments of the present invention might be practiced without some of these specific details. For example, structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. In other instances, well-known structures and devices are shown in block diagram form.

FIG. 1 is a block diagram illustrating an embodiment of a computer system. According to one embodiment, the computer system or physical machine 100 may include a personal computer (PC), a mainframe computer, a handheld device, a workstation, a server, a portable computer, a set-top box, an intelligent apparatus or system or appliance, a virtual machine, or any other computing system or device. As illustrated, the computer system 100 may include a bus or other communication device 102 for communicating information, and a processing device, such as processor 110, coupled with the bus 102 for processing information. Computer system 100 may further include a random access memory (RAM) or other dynamic storage device 104 (referred to as main memory), coupled with the bus 102 for storing information and instructions to be executed by processor 110. Main memory 104 may be used for storing temporary variables or other intermediate information during execution of instructions by processor 110. Computer system 100 also includes a read only memory (ROM) and/or other static storage device 106 coupled with bus 102 for storing static information and instructions for processor 110. Main memory 104 may include a type of machine medium readable by processor 110. Main memory 120 may store instructions and/or data for performing the execution of various embodiments of the present invention A data storage device 108 such as a magnetic disk or optical disc and its corresponding drive may also be coupled with the computer system 100 for storing information and instructions. Computer system 100 can also be coupled via bus 102 with a display device 114, such as a cathode ray tube (CRT) or Liquid Crystal Display (LCD), for displaying information to an end user. Typically, an alphanumeric input device 116, including alphanumeric and other keys, may be coupled with the bus 102 for communicating information and/or command selections to the processor 110. Another type of user input device may include cursor control 118, such as a mouse, a trackball, or cursor direction keys for communicating direction information and command selections to the processor 110 and for controlling cursor movement on the display 114.

A communication device 120 may also be coupled with the bus 102. The communication device 120 may include a modem, a network interface card, or other well-known interface devices, such as those used for coupling with Ethernet, token ring, or other types of physical attachment for purposes of providing a communication link to support a local or wide area network, for example. In this manner, the computer system 100 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of the computer system 100 may vary from implementation to implementation depending upon numerous factors, such as price constraints, performance requirements, technological improvements, and/or other circumstances.

It should be noted that, while the steps of various embodiments described herein may be performed under the control of a programmed processor, such as processor 110; in alternative embodiments, the steps of the various embodiments may be fully or partially implemented by any programmable or hard-coded logic, such as Field Programmable Gate Arrays (FPGA), transistor-transistor logic (TTL) logic, or Application Specific Integrated Circuits (ASIC), for example. Additionally, embodiments of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 2:
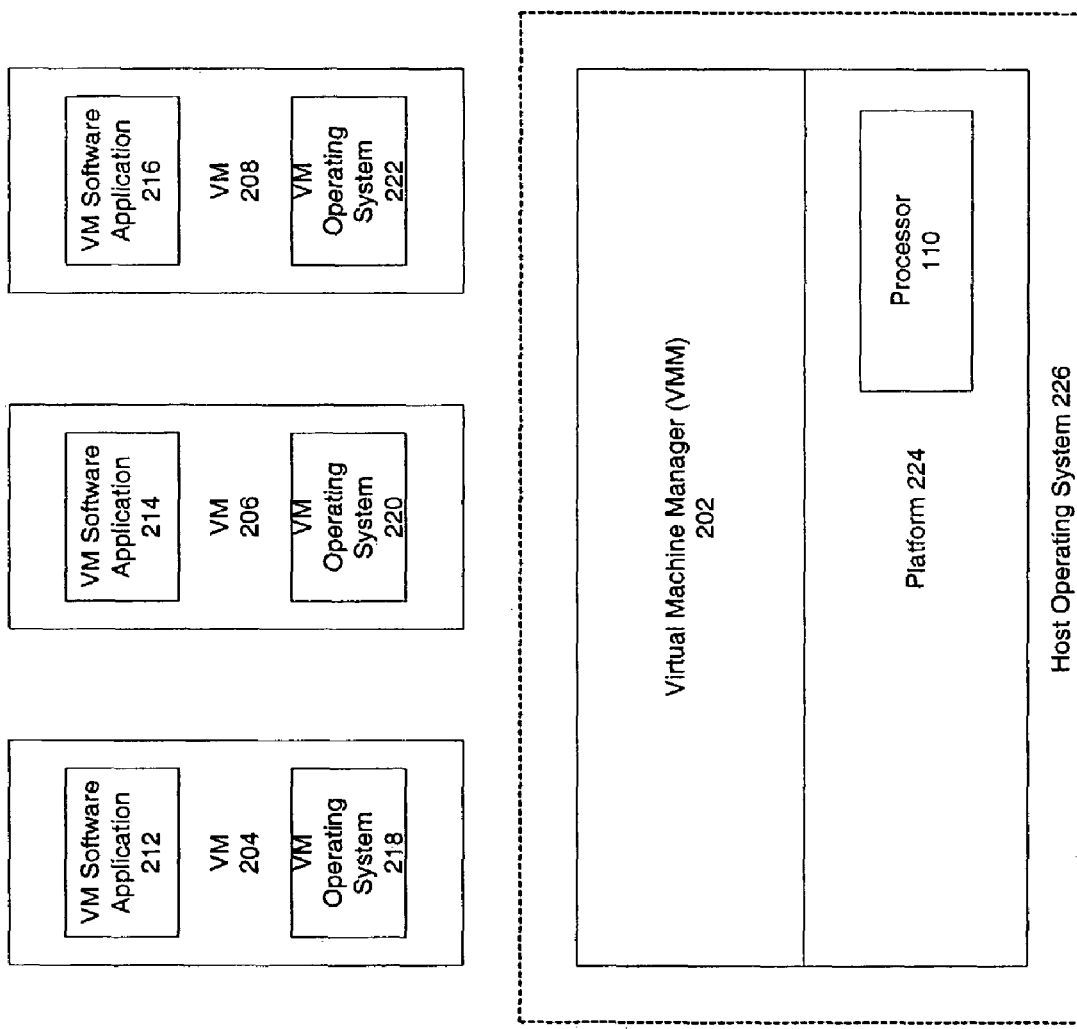
FIG. 2 is a block diagram illustrating an embodiment of a virtual-machine environment.

FIG. 2 is a block diagram illustrating an embodiment of a virtual-machine environment. According to one embodiment, as illustrated, the computer system or physical machine 100 (machine) may include a host platform or hardware platform (platform) 224. The platform 224 may include a processor 110 and other hardware devices and components, such as a programmable interrupt controller, a network card, a graphics card, and a disk controller (not shown). The machine 100 may include a virtual machine manager (VMM) 202, which may present a virtualized interface with some or all of the hardware devices and components of the platform 224 for each of the virtual machines (VM) 204-208. The processor 110 may be capable of, for example, executing an operating system (OS) or the VMM 202.

According to one embodiment, the machine 100 may include a personal computer (PC), a mainframe computer, a handheld device, a workstation, a server, a portable computer, or any other computing system or device. According to one embodiment, processor 110 may include any processor capable of executing software, such as a microprocessor, digital signal processor, microcontroller, or the like. The processor 110 may also include microcode, macrocode, software, programmable logic or hard coded logic for performing the execution of various embodiments of the present invention.

According to one embodiment, using a VMM 202, the machine 100 may be partitioned, such that the underlying hardware of the machine may appear as one or more independently operating VMs 204-208. The VMM 202 may run on a machine 100 and present to other software an abstraction of the VMs 204-208. Each VM may function as a self-contained platform, running its own operating system (OS) and/or application software, which may be collectively referred to as "guest software."

According to one embodiment, the guest software running in each VM 204-208 may include an OS 218-222, and software applications 212-216. According to one embodiment, the OS 218-222 may be expected to access physical resources (e.g., processors, registers, memory, and I/O devices) within the VMs 204-208 on which the OS 218-222 may be running and to handle various events including interrupts generated by various devices during the operation of the VMs 204-208. OS 218-222 may include standard OS, such as Unix, Linux, and Microsoft Windows. Similarly, application software 212-216 may include standard application software, such as Microsoft Word, Microsoft Explorer, Microsoft Outlook, and Web application servers, such as IBM WebSphere.

According to one embodiment, the machine 200 may include a host OS, such as OS 226. The host OS 226 may be one of the standard OS, such as Unix, Linux, and Microsoft Windows. According to one embodiment, the host OS 226 may be used to have the VMM 202 operate as part of the kernel of the host OS 226. Having the VMM 202 as part of the host OS 226, the VMs 204-208 may run on a combination of the host OS 226 and the VMM 202. According to another embodiment, the VMM 202 may operate on the bare hardware platform 224 and the VMs 204-208 may run on the VMM 202. According to one embodiment, various settings, combinations, and functions of the OS, such as OS 218-222 and 226, are contemplated. For example, the machine 200 may include OS 218-222 as the host OS, or may include the OS 226 as the host OS, or may include the like, or may include a combination thereof.

According to one embodiment, the VMM 202 may host software for the VMs 204-208 and may manage the VMs 204-208 according to the data stored in the memory of the machine 100, or according to the indicators provided to the VMM 202 by the machine 100. According to one embodiment, the VMM 202 may swap the software 212-222 state in and out of the processor 110, devices, memory and the registers of the machine as needed. The processor 110 may swap some state in and out during transitions between a VM 204-208 and the VMM 202. Furthermore, according to one embodiment, the VMM 202 may enhance the performance of a VM 204-208 by permitting direct access to the underlying machine 100.

Typically, a transition from the VMM 202 to one of the VMs 204-208 (e.g., to the Software 212-222) may be referred to as "entry" or "VM-entry," while a transition from one of the VMs 204-208 to the VMM 220 may be referred to as "exit" or "VM-exit." Collectively, entries and exits may be referred to as "transitions" or "VM-transitions." According to one embodiment, a VMM 202 may initiate a VM-entry by executing a particular instruction to cause the VM-entry. A VM-exit may be explicitly requested by a VM 204-208, for example, by executing a special instruction to generate the VM exit. According to another embodiment, a VM 204-208 may not explicitly request a transition, but instead an event or occurrence, such as protection fault, interrupt, or an instruction executed by a VM 204-208, may require a VM-exit as determined by the virtual machine management of the machine 100. For example, if a particular control bit is set, then the execution of an instruction may cause a VM-exit, or occurrences of a non-maskable interrupt may cause VM-exits.

According to one embodiment, the VM-entry controls may be represented as a bit string having a length of 7 bits having each bit location within the bit string identifying or representing an action or non-action regarding a particular element or component of the machine 100 or machine state. The VM-exit controls, on the other hand, may be represented as a bit string having a length of 4 bits.

According to one embodiment, the processor 110 may act on various elements of the machine state of the machine 100. The machine state may be associated with a variety of architectural components, such as the processor 110, Input/Output (I/O) devices, and chipset. Machine state may include general purpose and floating-point registers (e.g., in the Instruction Set Architecture (ISA) of Intel's Pentium IV referred to as Intel Architecture-32 (IA-32) ISA, and the like), control registers (CR) (e.g., in the IA-32 ISA, CR0, CR3; and the like), instruction pointers (WP) (e.g., in the IA-32 ISA, Extended IP, and the like), processing flags (FLAGS) (e.g., in the IA-32 ISA, Extended FLAGS, and the like), model-specific registers (MSR) (e.g., in the IA-32 ISA, and the like), segment registers (e.g. in the IA-32 ISA, and the like, which may include selector, base, limit, and byte fields), additional internal (architectural or non-architectural) machine state (e.g., sleep state, interpretability information, state-machine state), memory management related state (e.g., translation look aside buffer (TLB) contents), chipset registers, I/O device state, and others. The machine 100 may employ a flexible architecture for implementing mechanisms that are used when managing the loading and/or storing of machine state during transitions (e.g., entries and exits) between the VMM 202 and the VMs 204-208.

According to one embodiment, the VMM 202, though typically implemented in software, may emulate and export a machine interface to higher-level software. Such higher level software may include a standard or real-time OS 218-222, or may be a highly stripped down operating environment with limited OS functionality, or may not include traditional OS facilities, and the like. According to one embodiment, for example, the VMM 202 may be run within, or on top of, another VMM.

According to one embodiment, the processor 110 may execute the VMM 202, and the VMM 202 may be implemented in software or exports-a bare machine interface to higher-level software. The interface may be exported as one or more VMs 204-208 and may mirror the actual platform 224, e.g., the processor 110 or the machine 100, so that it is virtualized. According to another embodiment, the interface exported by the VMM 202 may differ in some or all respects so that a different host platform may be emulated.

Figure 3:
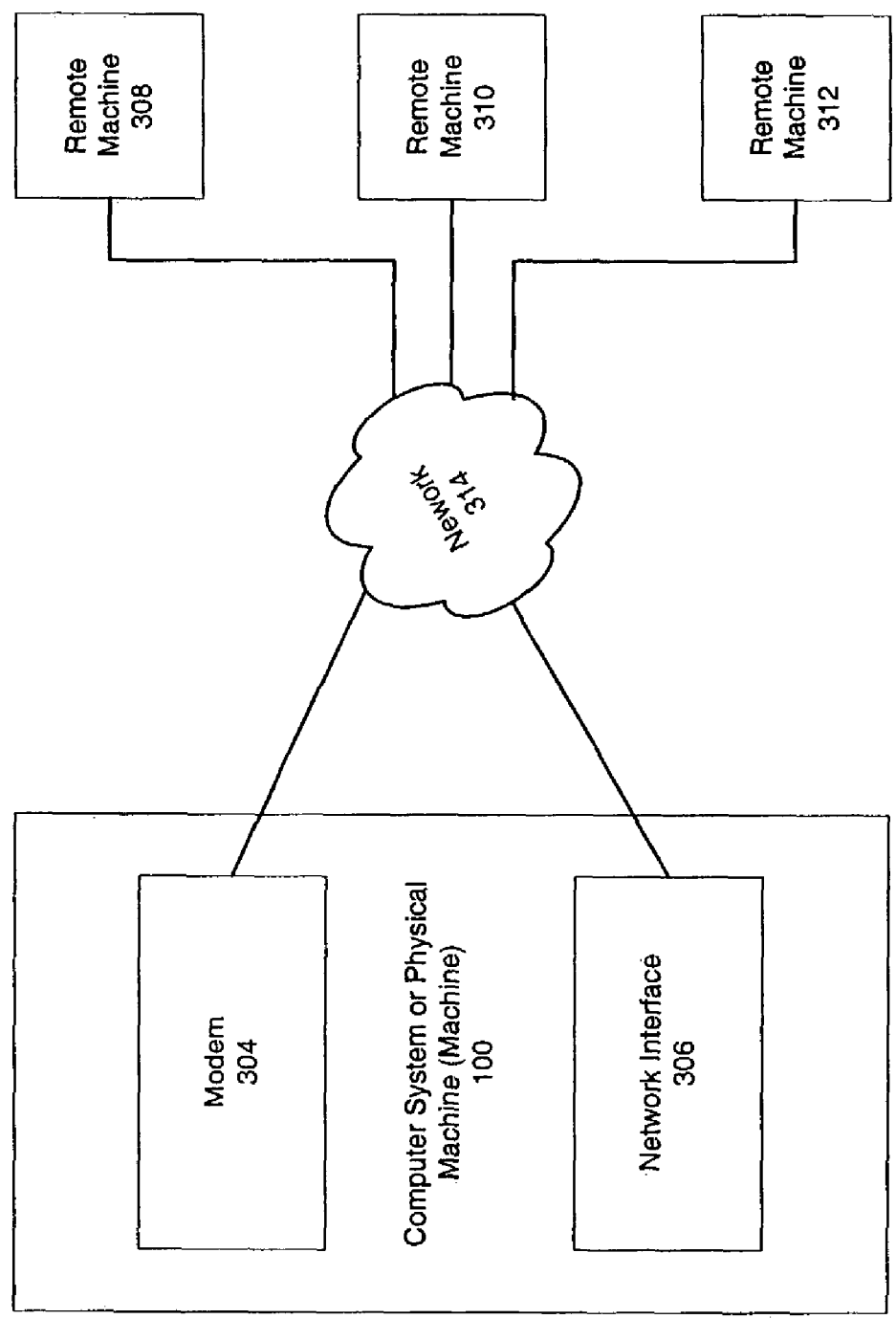
FIG. 3 is a block diagram illustrating an embodiment of a network environment.

FIG. 3 is a block diagram illustrating an embodiment of a network environment. According to one embodiment, a computer system or physical machine 100 (machine) may include a single machine, or multiple machines coupled with each other directly, or via a network or device, or via other physical and/or logical links.

According to one embodiment, as illustrated, the machine 100 may include a modem 304 and/or a network interface 306. The machine 100, for example, may be coupled or communicatively connected with other remote machines 308-312 via a network 314 using the modem 304, or the network interface 306, or the like. The network 314 may include a physical network, a logical network, a wide area network (WAN), a local area network (LAN), the Internet, an intranet, or the like. As will be appreciated by one skilled in the art, any communication via network 314 may include the use of a variety of wired and/or wireless carrier and protocols, including radio frequency (RF), satellite, microwave, Bluetooth, optical, infrared, cable, laser, or the like.

Figure 4:
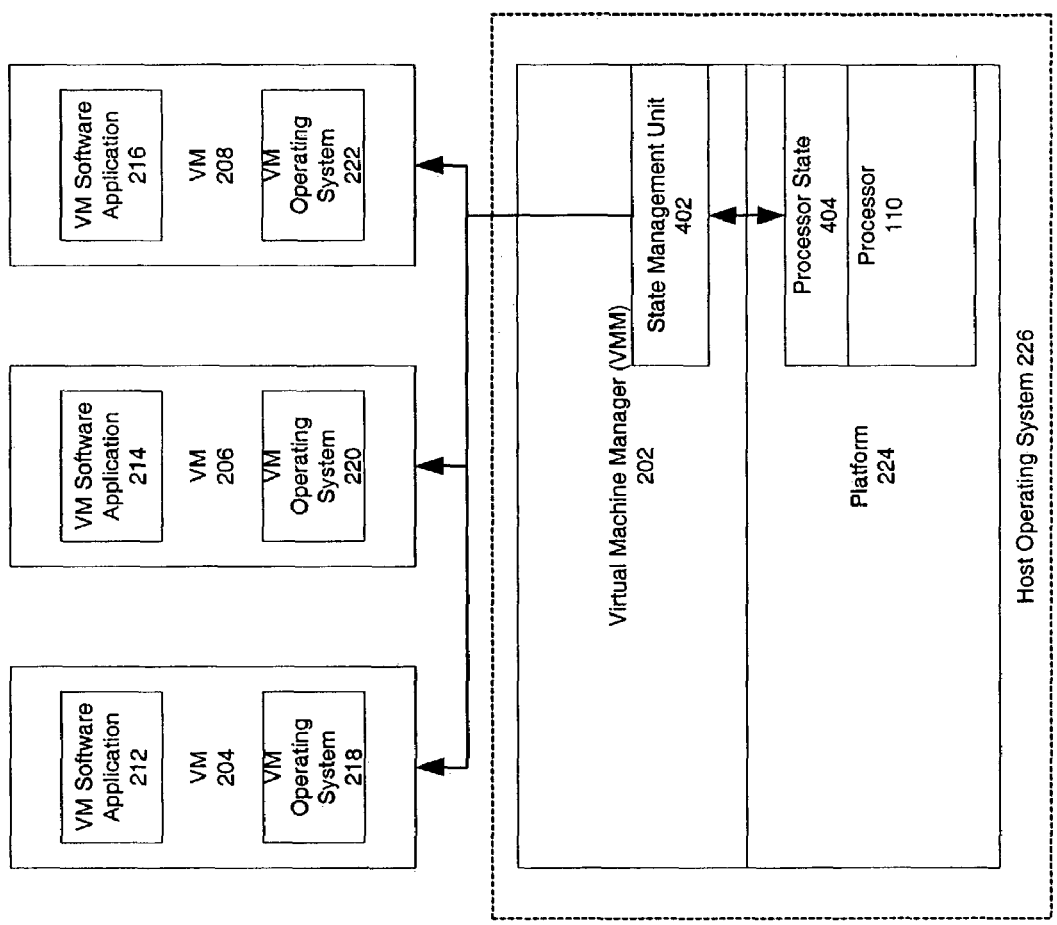
FIG. 4 is a block diagram illustrating an embodiment of virtual machine management.

FIG. 4 is a block diagram illustrating an embodiment of virtual machine management. According to one embodiment, as illustrated, the computer system or physical machine 100 (machine) may include a host platform or hardware platform (platform) 224. The platform 224 may include a processor 110 and other hardware devices and components, such as a programmable interrupt controller, a network card, a graphics card, and a disk controller. The machine 100 may include a virtual machine manager (VMM) 202, which may present a virtualized interface with some or all of the hardware devices and components of the platform 224 for each of the virtual machines (VM) 204-208. The processor 110 may be capable of, for example, executing an operating system (OS) or the VMM 202. Typically, the VMM 202 may serve as the host of the VMs 204-208 for swapping between the VMs 204-208. According to one embodiment the VMM 202 may be implemented, for example, as hardware on the chipset or as software, or as a combination thereof. The processor 110 may serve as the host platform and may include one or more processors, including hyperthreaded processors.

According to one embodiment, using a VMM 202, the machine 100 may be partitioned, such that the underlying hardware of the machine may appear as one or more independently operating VMs 204-208. The VMM 202 may run on a machine 100 and present to other software an abstraction of the VMs 204-208. Each VM may function as a self-contained platform, running its own operating system (OS) and/or application software, which may be collectively referred to as "guest software."

According to one embodiment, the guest software running in each VM 204-208 may include an OS 218-222, and software applications 204-208. According-to one-embodiment, the OS 218-222 may be expected to access physical resources (e.g., processors, registers, memory, and I/O devices) within the VMs 204-208 on which the OS 218-222 may be running and to handle various events including interrupts generated by various devices during the operation of the VMs 204-208. OS 218-222 may include standard OS, such as Unix, Linux, and Microsoft Windows. Similarly, application software 212-216 may include standard application software, such as Microsoft Word, Microsoft Explorer, Microsoft Outlook, and Web application servers, such as IBM WebSphere.

According to one embodiment, the machine 200 may include a host OS, such as OS 226. The host OS 226 may be one of the standard OS, such as Unix, Linux, and Microsoft Windows. According to one embodiment, the host OS 226 may be used to have the VMM 202 operate as part of the kernel of the host OS 226. Having the VMM 202 as part of the host OS 226, the VMs 204-208 may run on a combination of the host OS 226 and the VMM 202. According to another embodiment, the VMM 202 may operate on the bare hardware platform 224 and the VMs 204-208 may run on the VMM 202. According to one embodiment, various settings, combinations, and functions of the OS, such as OS 218-222 and 226, are contemplated. For example, the machine 200 may include OS 218-222 as the host OS, or may include the OS 226 as the host OS, or may include the like, or may include a combination thereof.

According to one embodiment, the machine 100 may include a personal computer (PC), a mainframe computer, sa handheld device, a workstation, a server, a portable computer, a set-top box, an intelligent apparatus or system or appliance, a virtual machine, or any other computing system or device. According to one embodiment, processor 110 may include any processor capable of executing software, such as a microprocessor, a hyperthreaded processor, a digital signal processor, a microcontroller, or the like, or a combination thereof. The processor 110 may also include microcode, macrocode, software, programmable logic, hard coded logic, or the like, or a combination thereof for performing the execution of various embodiments of the present invention. Furthermore, according to one embodiment, the machine 100 may include one or more processors including one or more hyperthreaded processors.

According to one embodiment, the VMM 202 may host software for the VMs 204-208 and may manage the VMs 204-208 according to the data stored in the memory of the machine 100, or according to the indicators provided to the VMM 202 by the machine 100. However, according to one embodiment, the data stored may be dynamically updated and stored, and referred to as history, based on one or more factors. The one or more factors may include the following: how a particular task is performed by a particular VM 204-208, the overall performance of the VMs 204-208, the VM 204-208 compatibility with the corresponding software application 212-216, event monitoring (EMON) data, data from other hooks on the processor 110, characteristics and history of the VMs 204-208 (also referred to as "VM profile"), and characteristics and history of the processor 110 (also referred to as "processor profile"). EMON data, also known as E86MON data, may include processor-specific counters and registers dynamically indicating information about the inner workings of the processor 110.

According to one embodiment, the machine 100 may include multiple processors 110, including multiple hyperthreaded processors 110, to read the stored data to effectively and efficiently manage the VMs 204-208 and the Software 212-222. A hypethreaded processor includes a physical processor with multiple threads or logical processors that give the appearance of multiple processors and share the physical execution resources. The VMM 202 may swap the Software 212-222 state in and out of the processor 110, devices, memory and the registers of the machine as needed. The processor 110 may swap some state in and out during transitions between a VM 204-208 and the VMM 202. Furthermore, according to one embodiment, the VMM 202 may enhance the performance of a VM 204-208 by permitting direct access to the underlying machine 100.

According to one embodiment, the machine 100 may include a state monitoring/management engine or unit (state management unit) 402 to monitor the processor state 404 of the processor 110. According to one embodiment, the state management unit 402 may be hardware implemented on the processor 110 or a chipset. According to another embodiment, the state management unit 402 may be software implemented on the VMM 202. The state management unit, according to another embodiment, may be a combination of software and hardware. The VMM 202, using the state management unit 402 may manage the VMs 204-208 based on the processor state information gathered by monitoring the processor state 404 of the processor 110. According to one embodiment, the processor state information including the processor profile and/or VM profile may provide the VMM 202 with the ability to intelligently manage the VMs 204-208.

According to one embodiment, the VM schedule operation, e.g., when to swap between the VMs 204-208, may be determined based on the processor state information gathered by monitoring the processor state 404. Stated differently, the swapping or altering between the VMs 204-208 may be dynamic, e.g., swapping between the VMs 204-208 based on the characteristics of the processor 110 rather than based on predetermined time slices (time quantum) assigned to the VMs 204-208. Although, according to one embodiment, a time quanta may be allocated to each of the VMs 204-208, the time allocation based on a predetermined criteria or scheme may be subject to change based on the processor state information.

According to one embodiment, monitoring the processor state 404, for example, may include monitoring instruction and data caches, instruction pipelines (traditional, Explicitly Parallel Instruction Computing (EPIC), Out-Of-Order execution (OOO)), branch target buffers (BTB), and cache line predictors. For example, if current VM 204 has recently flushed the entire data cache to the memory and its time quanta has not yet expired, the VMM 202, according to one embodiment, may switch to another VM 206, rather than allowing the processor 110 to begin prefetching data that the current VM 204 may not use before its quanta expires. In such circumstances, the switch from the current VM 204 to the next VM 206 may save important time and memory-bus bandwidth making the machine 100 more efficient.

According to one embodiment, for example, by watching or monitoring the state of the BTB for the current VM's 204 execution stream, the VMM 202 may change the time quanta of VM 204, running in a tight loop, allowing the BTB and the instruction cache to be more optimally reused, as opposed to switching to another VM, e.g., VM 206 or VM 208, which may not benefit from the data. According to another embodiment, for example, the BTB and the instruction pointer may indicate the end of a loop, and the VMM 202 may switch from VM 204 to VM 206 earlier than as previously determined to, for example, pay back the VM 206 for previous preemptions.

According to one embodiment, the machine 100 may include a software-based. VMM 202 having a software-based state management unit 402. According to another embodiment, the VMM 202 and the state management unit 402 may be hardware-based implemented on the processor 110 or the chipset. With regard to the software-based VMM 202, the state management unit 402 may monitor the processor 110 and the processor state 404 to gather the processor state information from, for example, EMON registers and other hooks (current and planned) into the processor 110. With regard to the hardware-based VMM 202 and the state management unit 402, according to one embodiment, direct processor-related data collection may be employed, such as accessing the hooks into the processor 110 to obtain the processor state information.

According to one embodiment, using the processor state information may include using or taking advantage of any information relating to the processor's 110 history of execution or predicted future execution in branch prediction or speculative execution. According to one embodiment, the processor profile used by the VMM 202 may include processor history as recent as present or concurrent event, or as distant as since the last powering-on of the machine 100. Furthermore, the processor profile or the use of the processor profile may be compatible with recent processor-related technologies and enhancements and may make the processors 110 even more efficient with intelligent scheduling, optimization, and management of the VMs 204-208.

The managing of the VMs 204-208, according to one embodiment, may provide a framework and guidance for software tweaking and optimization by using the processor state information. According to one embodiment, intelligent scheduling of the VMs 204-208 may provide for tweaking and optimization of both the time quanta allocated to each of the VMs 204-208 and the surrounding processor state 404 in each of the VM's 204-208 execution.

Furthermore, the processor 110 may be more diverse and more complex, such as deeply pipelined or super-pipelined, out-of-order, Explicitly Parallel Instruction Computing (EPIC), or having large instruction and data caches, the intelligent scheduling and managing of the VMs 204-208, according to one embodiment, may provide a notable performance improvement to such and future processors by accommodating unique characteristics of a particular processor 110 and intelligently choosing the time of context switches between the processor-based VMs 204-208.

Figure 5:
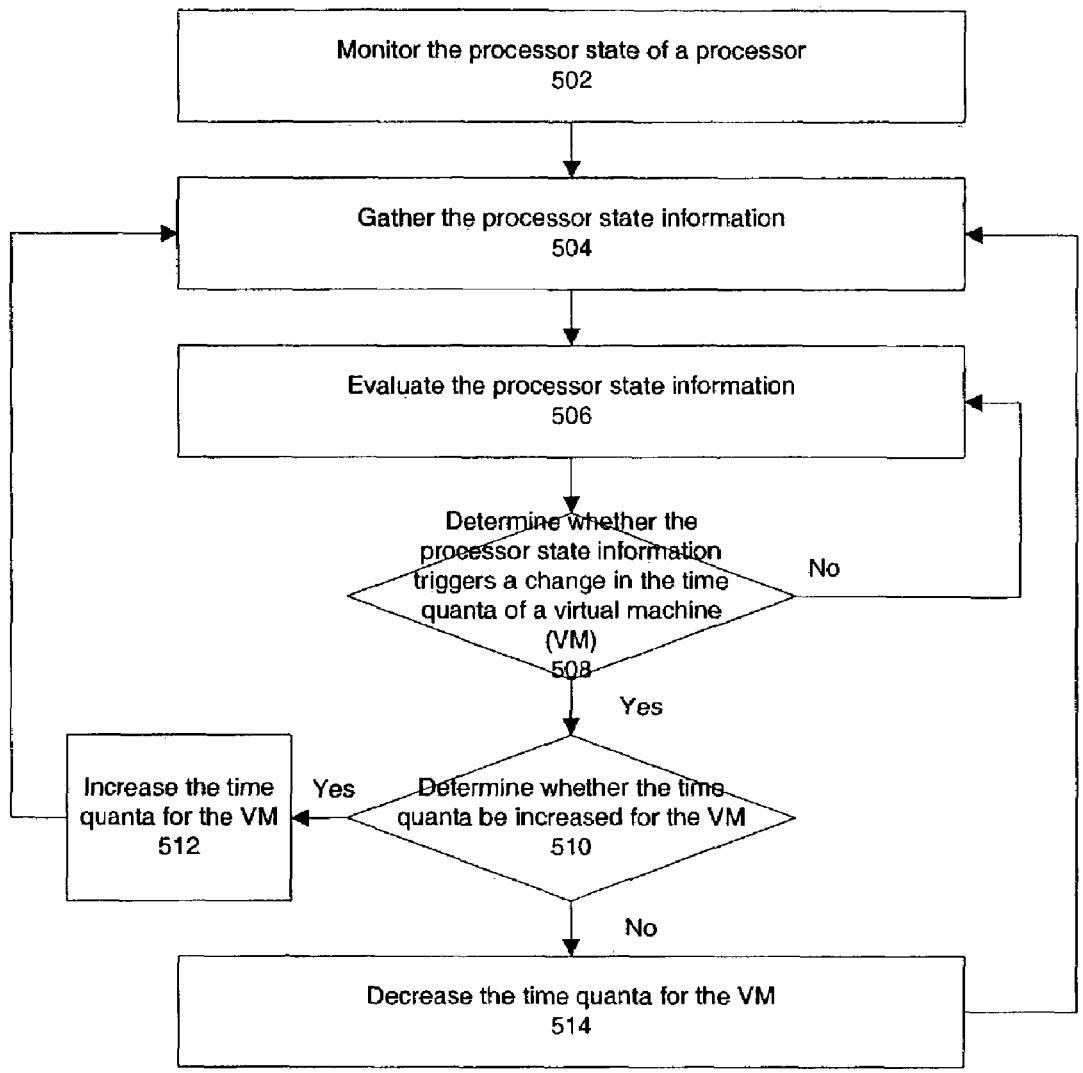
FIG. 5 is a flow diagram illustrating an embodiment of a virtual machine management process.

FIG. 5 is a flow diagram illustrating an embodiment of a virtual machine management process. First, according to one embodiment, the state monitoring/management engine or unit (state management unit) of a virtual machine manager (VMM) may monitor the processor state of a processor at processing block 502. The state management unit may be implemented as hardware or software, or as a combination thereof. The VMM may serve as the host of the virtual machines (VMs) of the computer system or physical machine (machine). According to one embodiment, the VMM may be considered hosting software for the VMs and may manage the VMs according to the data stored in the memory of the machine, or according to the indicators provided to the VMM by the machine.

According to one embodiment, the state management unit of the VMM may gather the processor state information as it monitors the processor state of the processor at processing block 504. The processor state information, according to one embodiment, may include characteristics and history of the processor ("processor profile") and/or characteristics and history of the VMs ("VM profile") as indicated by the processor state. The processor state information may be used to intelligently schedule and manage the VMs. According to one embodiment, processor state information may include information regarding instruction and data caches, various instruction pipelines, branch target buffers, and the like.

According to one embodiment, the processor state information may be evaluated at processing block 506. Evaluating the processor state information may include evaluating the profiles of the processor and VMs, including, for example, evaluating the branch target buffer relating to the current VM execution. The history may include very recent history, such as an event occurring at the present instant, or very long history, such as the very first event since the powering-on of the machine noted in the processor state information. At decision block 508, whether there is any indication or event that would trigger a change in the amount of time allocated (time quanta) to each of the VMs is determined. If not, the processing continues with first gathering and then evaluating the processing state information at processing blocks 504 and 506, respectively. If yes, then, at decision block 510, whether time quanta assigned to a particular VM is to be increased based on the processor state information gathered and evaluated is determined. If yes, the time quanta initially assigned to a particular VM is increased at processing block 512. If not, time from the time quanta previously assigned to a particular VM is decreased at processing block 514.

According to one embodiment, a time quanta may be allocated to each of the VMs. The VMM may monitor and manage each of the VMs according to its previously assigned time quanta; for example, 1 millisecond (ms) of time quanta allocated to each of the VMs. However, according to one embodiment, using the state management unit of the VMM and by evaluating the processing state information may help the VMM intelligently determine whether the time quanta assigned to a particular VM be change, i.e., whether time be added to or decreased from the originally allocated time quanta; for example, decreasing time quanta to ½ ms or increasing the time quanta to 1½ ms.

Furthermore, for example, the VMM may provide more time to a certain VM, such as VM-1, if VM-1 is performing a particular task, which, historically, based on the processor state information, is better performed by VM-1 than any of the other VMs. Conversely, if, historically, VM-2 is better at performing the same task, then, VM-1's time may be reduced by the VMM to transfer the task to VM-2. According to one embodiment, using the example of VM-1 and VM-2 performing a particular task, the change may be made in the parameters, e.g., VM-1 and VM-2 may be provided more or less time on a relatively permanent manner by changing the parameters, or the change may be regimented by the VMM every time the event, as mentioned in the example, occurs.

Stated differently, according to one embodiment, processor state information, including characteristics and history of the processor and the VMs, may be gathered at the processor level and used to manage the VMs. The processor state information may include profiles of the VMs indicating what the VMs have done in the past and what are they likely to do in the future under certain circumstances. The VM past, according to one embodiment, may include instantaneous or nearly instantaneous history of the VM, or historically what may have occurred since the powering-on of the machine. For example, with instruction data cache, if L1 cache is full of data and it has been traversing data by, for example, looping, the VMM may select to provide extra portion of the time clock to a particular VM to continue and finish the process rather than to eject all of the data from the L1 cache and later recreate the cache that is currently in an optimal state. With regard to a branch target buffer (BTB), for example, the VM history may provide the VMM with the information and history relating to a loop or course of execution of the BTB. By using the history, the processor may, for example, prefetch based on whether the answer will be yes or no according to the history. Stated differently, using the processor state information, a more refined decision may be made by intelligently selecting and managing the VMs. Such intelligent selection and management of the VMs may not only reduce cost, but may also enhance the performance of the machine.

According to one embodiment, the processor may perform the embodiments of the present invention by, for example, processing logic that may include hardware, such as circuitry, dedicated logic, programmable logic, microcode, or software, such as executing on a general purpose computer system or a dedicated machine, or a combination thereof. Furthermore, the machine 100 may include architecture flexible enough to implement components and/or mechanisms that may be used for virtual machine management, according to one embodiment.

Figure 6:
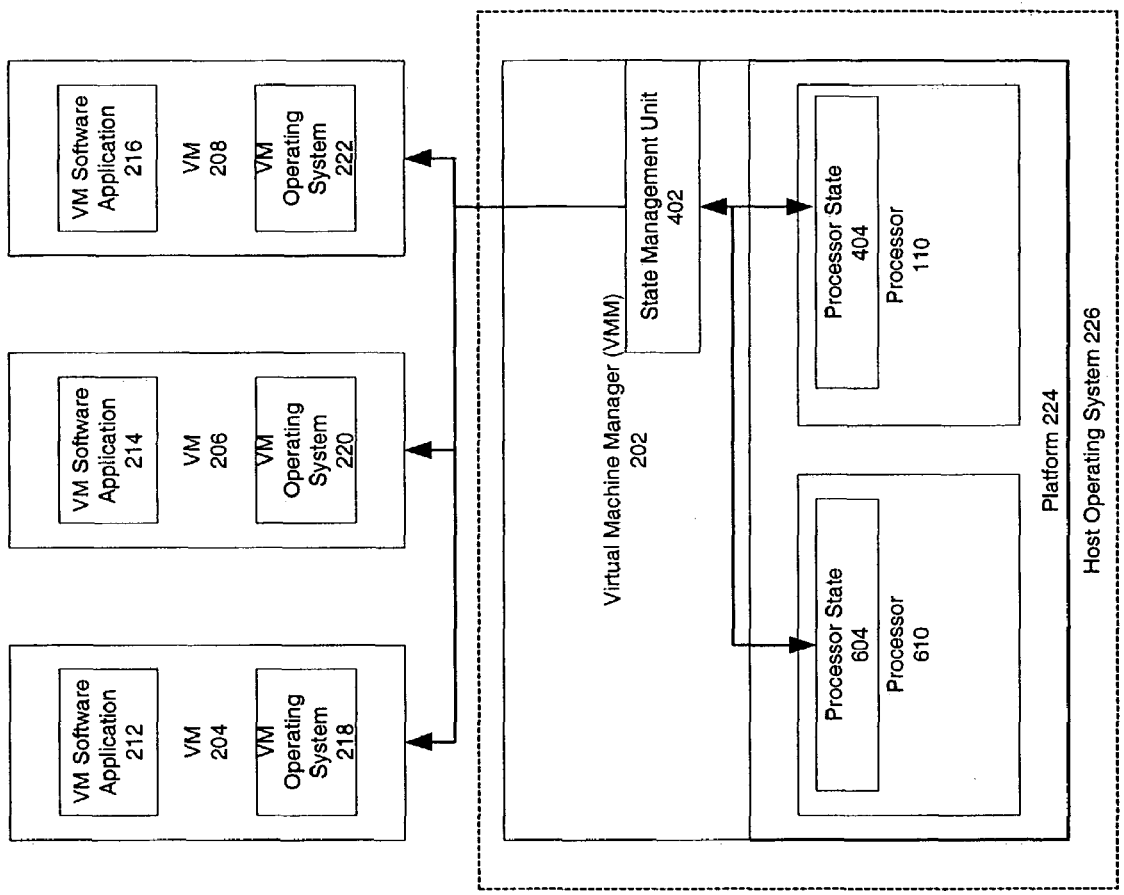
FIG. 6 is a block diagram illustrating an embodiment of virtual machine management using multiple processors.

FIG. 6 is a block diagram illustrating an embodiment of virtual machine management using multiple processors. According to one embodiment, as illustrated, the computer system or physical machine 100 (machine) may include a host platform or hardware platform (platform) 224. The platform 224 may include processors 110, 610 and other hardware devices and components, such as a programmable interrupt controller, a network card, a graphics card, and a disk controller. The machine 100 may include a virtual machine manager (VMM) 202, which may present a virtualized interface with some or all of the hardware devices and components of the platform 224 for each of the virtual machines (VM) 204-208. The processors 110, 610 may be capable of, for example, executing an operating system (OS) or the VMM 202. Typically, the VMM 202 may serve as the host of the VMs 204-208 for swapping between the VMs 204-208. According to one embodiment, the VMM 202 may be implemented as hardware on the chipset or the processor, or as software, or as a combination thereof.

According to one embodiment, the guest software running in each VM 204-208 may include an OS 218-222, and software applications 204-208. According to one embodiment, the OS 218-222 may be expected to access physical resources (e.g., processors, registers, memory, and I/O devices) within the VMs 204-208 on which the OS 218-222 may be running and to handle various events including interrupts generated by various devices during the operation of the VMs 204-208. OS 218-222 may include standard OS, such as Unix, Linux, and Microsoft Windows. Similarly, application software 212-216 may include standard application software, such as Microsoft Word, Microsoft Explorer, Microsoft Outlook, and Web application servers, such as IBM WebSphere.

According to one embodiment, the machine 200 may include a host OS, such as OS 226. The host OS 226 may be one of the standard OS, such as Unix, Linux, and Microsoft Windows. According to one embodiment, the host OS 226 may be used to have the VMM 202 operate as part of the kernel of the host OS 226. Having the VMM 202 as part of the host OS 226, the VMs 204-208 may run on a combination of the host OS 226 and the VMM 202. According to another embodiment, the VMM 202 may operate on the bare hardware platform 224 and the VMs 204-208 may run on the VMM 202. According to one embodiment, various settings, combinations, and functions of the OS, such as OS 218-222 and 226, are contemplated. For example, the machine 200 may include OS 218-222 as the host OS, or may include the OS 226 as the host OS, or the like, or may include a combination thereof.

Although two processors 110, 610 are illustrated, the machine 110 may include more than two processors 110, 610. Furthermore, according to one embodiment, the two or more processors 110, 610 may be any one or a combination of any of the following: a microprocessor, a hyperthreaded processor, a digital signal processor, a microcontroller, and the like. According to one embodiment, the processors 110, 610 may include microcode, macrocode, software, programmable logic, hard coded logic, or the like, or a combination thereof, for, for example, performing the execution of various embodiments of the present invention. The machine 100, according to one embodiment, may include a personal computer (PC), a mainframe computer, a handheld device, a workstation, a server, a portable computer, a set-top box, an intelligent apparatus or system or appliance, a virtual machine, or any other computing system or device.

According to one embodiment, the machine 100 may include state monitoring/management engine or unit (state management unit) 402 hardware or firmware or software, or a combination thereof, implemented in or coupled with the VMM 202 or the processors 110, 610 to monitor the processor states 404, 604 of the processors 110, 610. According to one embodiment, the VMM 202 may be considered hosting software for the VMs 204-208 and may manage the VMs 204-208 according to the data stored in the memory of the machine 100, or according to the indicators provided to the VMM 202 by the machine 100.

According to one embodiment, the VMM 202 may host software for the VMs 204-208 and may manage the VMs 204-208 according to the data stored in the memory of the machine 100, or according to the indicators provided to the VMM 202 by the machine 100. According to one embodiment, the VMM 202 may manage the VMs 204-208 based on the processor state information gathered by monitoring the corresponding processor state 404, 604 of each of the processors 404, 604. According to one embodiment, the processor state information may include, for example, characteristics and history of the processors 110, 610, characteristics and history of the VMs 204-208, event monitoring (EMON) data, and other hooks into the processors 110, 610. EMON data, also known as E86MON data, may include processor-specific counters and registers dynamically indicating information about the inner workings of the processors 110, 610.

Figure 7:
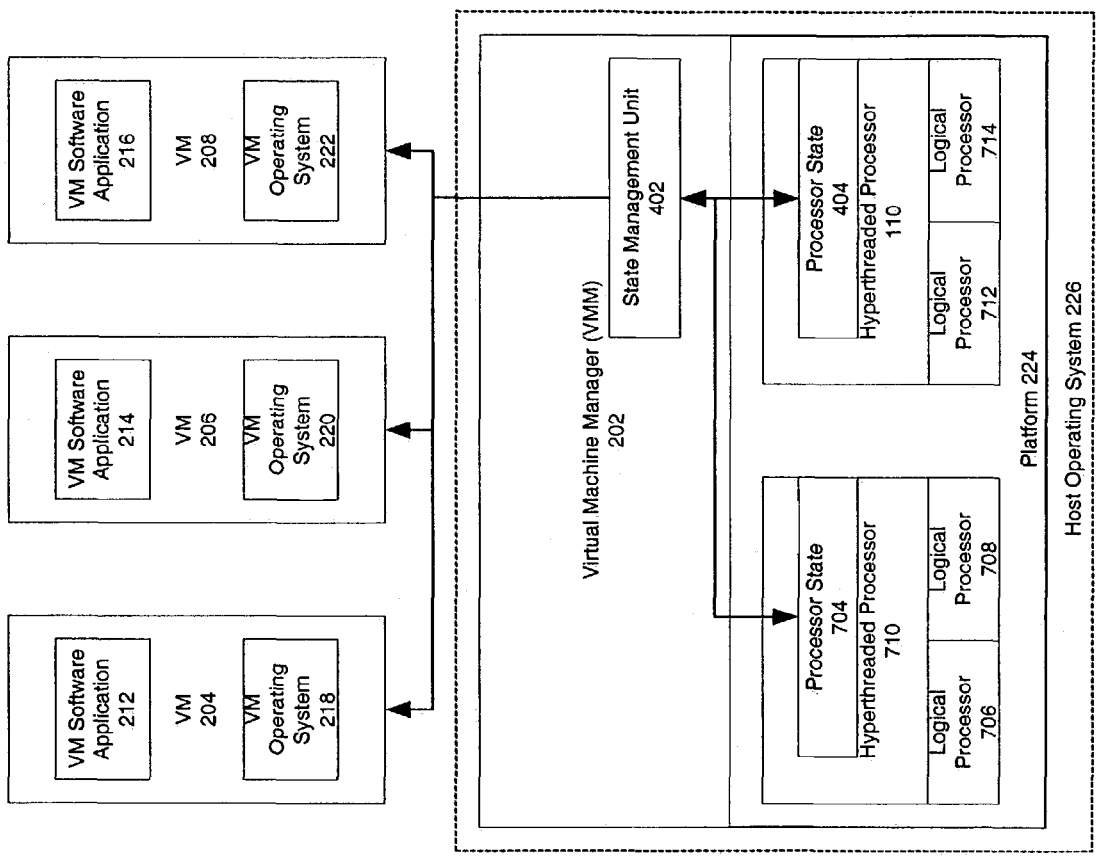
FIG. 7 is a block diagram illustrating an embodiment of virtual machine management using multiple hyperthreaded processors.

FIG. 7 is a block diagram illustrating an embodiment of virtual machine management using multiple hyperthreaded processors. According to one embodiment, as illustrated, the computer system or physical machine 100 (machine) may include a host platform or hardware platform (platform) 224. The platform 224 may include processors 110, 710 and other hardware devices and components, such as a programmable interrupt controller, a network card, a graphics card, and a disk controller. The machine 100 may include a virtual machine manager (VMM) 202, which may present a virtualized interface with some or all of the hardware devices and components of the platform 224 for each of the virtual machines (VM) 204-208. The processors 110, 710 may be capable of, for example, executing an operating system (OS) or the VMM 202. Typically, the VMM 202 may serve as the host of the VMs 204-208 for swapping between the VMs 204-208. According to one embodiment the VMM 202 may be implemented as hardware on the chipset or the processor, or as software, or as a combination thereof.

According to one embodiment, the guest software running in each VM 204-208 may include an OS 218-222, and software applications 204-208. According to one embodiment, the OS 218-222 may be expected to access physical resources (e.g., processors, registers, memory, and I/O devices) within the VMs 204-208 on which the OS 218-222 may be running and to handle various events including interrupts generated by various devices during the operation of the VMs 204-208. OS 218-222 may include standard OS, such as Unix, Linux, and Microsoft Windows. Similarly, application software 212-216 may include standard application software, such as Microsoft Word, Microsoft Explorer, Microsoft Outlook, and Web application servers, such as IBM WebSphere.

According to one embodiment, the machine 200 may include a host OS, such as OS 226. The host OS 226 may be one of the standard OS, such as Unix, Linux, and Microsoft Windows. According to one embodiment, the host OS 226 may be used to have the VMM 202 operate as part of the kernel of the host OS 226. Having the VMM 202 as part of the host OS 226, the VMs 204-208 may run on a combination of the host OS 226 and the VMM 202. According to another embodiment, the VMM 202 may operate on the bare hardware platform 224 and the VMs 204-208 may run on the VMM 202. According to one embodiment, various settings, combinations, and functions of the OS, such as OS 218-222 and 226, are contemplated. For example, the machine 200 may include OS 218-222 as the host OS, or may include the OS 226 as the host OS, or the like, or may include a combination thereof.

According to one embodiment, each of the hyperthreaded processors 110, 710 may serve as the host platform for all of the VMs 204-208. According to another embodiment, each of the hyperthreaded processors 110, 710 may serve as a corresponding host platform for one of the VMs 204-208, called corresponding VM. Although two hyperthreaded processors 110, 710 are illustrated, the machine 110 may include more than two hyperthreaded processors 110, 710. Furthermore, according to one embodiment, both processors 110, 710 may be hyperthreaded processors, or one or more hyperthreaded processors combined with any one or more of the following: a microprocessor, a digital signal processor, a microcontroller, and the like. According to one embodiment, the hyperthreaded processors 110, 710 may include microcode, macrocode, software., programmable logic, hard coded logic, or the like, or a combination thereof, for performing the execution of various embodiments of the present invention. The machine 100, according to one embodiment, may include a personal computer (PC), a mainframe computer, a handheld device, a workstation, a server, a portable computer, a set-top box, an intelligent apparatus or system or appliance, a virtual machine, or any other computing system or device.

Each of the hyperthreaded processor 110, 710 may include a single physical processor with multiple threads or multiple logical processors, such as 706-708, 712-714, and a processor state 404, 704 corresponding to each of the processors 110, 710. The threads or logical processor 706-708, 712-714 may appear as multiple processors and share the physical execution resources. According to one embodiment, the machine 100 may include a state monitoring/management engine or unit (state management unit) 402 hardware or firmware or software, or a combination thereof, implemented in or coupled with the VMM 202 or the processors 110, 710, to monitor the processor states 404, 704 of the processors 110, 710.

According to one embodiment, the VMM 202 may host software for the VMs 204-208 and may manage the VMs 204-208 according to the data stored in the memory of the machine 100, or according to the indicators provided to the VMM 202 by the machine 100. According to one embodiment, the VMM 202 may manage the VMs 204-208 based on the processor state information gathered by monitoring the corresponding processor state 404, 604 of each of the hyperthreaded processors 110, 710. According to one embodiment, the processor state information may include, for example, characteristics and history of the processors 110, 710, characteristics and history of the VMs 204-208, event monitoring (EMON) data, and other hooks into the processors 110, 710. EMON data, also known as E86MON data, may include processor-specific counters and registers dynamically indicating information about the inner workings of the processors 110, 710.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software, or a combination thereof.

What is claimed is:

1. A method comprising:
   gathering information relating to a processor, wherein the information comprises processor state information having one or more of characteristics of the processor, history of the processor, characteristics of a first virtual machine and a second virtual machine, history of the first and second virtual machines, and event monitoring data;
   evaluating the information relating to the processor; and
   managing the first virtual machine and the second virtual machine via the information, the managing of the first and second virtual machines including managing a predetermined processing time allocated to each of the first virtual machine and the second virtual machine, the managing further including dynamically allocating resources including extending, suspending, increasing, or decreasing the predetermined processing time allocated to the first virtual machine and/or the second virtual machine, wherein the dynamically allocating resources further includes switching tasks being performed on the first virtual machine to the second virtual machine when the second virtual machine is determined to be better at performing the tasks than the first virtual machine based on the information, suspending the predetermined processing time allocated to the first virtual machine and extending a predetermined processing time allocated to the second virtual machine by granting the suspended predetermined processing time allocated to the first virtual machine to the second virtual machine, wherein the predetermined processing time is allocated by a central processing unit to perform the tasks.

2. The method of claim 1, further comprising monitoring the processor.

3. The method of claim 1, wherein the managing of the first and second virtual machines is performed by a virtual machine manager (VMM) comprising a state management unit.

4. A system comprising:
   a storage medium to store information relating to a processor coupled with the storage medium; and
   a processor having a virtual machine manager (VMM), wherein the VMM to gather information relating to the processor, wherein the information comprises processor state information having one or more of characteristics of the processor, history of the processor, characteristics of a first virtual machine and a second virtual machine, history of the first and second virtual machines, and event monitoring data,
   evaluate the information relating to the processor, and
   manage a first virtual machine and a second virtual machine via the information, the managing of the first and second virtual machines including managing a predetermined processing time allocated to each of the first virtual machine and the second virtual machine, the managing further including dynamically allocating resources including extending, suspending, increasing, or decreasing the predetermined processing time allocated to the first virtual machine and/or the second virtual machine, wherein the dynamically allocating resources further includes switching tasks being performed on the first virtual machine to the second virtual machine when the second virtual machine is determined to be better at performing the tasks than the first virtual machine based on the information, suspending the predetermined processing time allocated to the first virtual machine and extending a predetermined processing time allocated to the second virtual machine by granting the suspended predetermined processing time allocated to the first virtual machine to the second virtual machine, wherein the predetermined processing time is allocated by a central processing unit to perform the tasks.

5. The system of claim 4, wherein the VMM comprises a state management unit to monitor the processor.

6. The system of claim 4, wherein the processor comprises one or more of microprocessors, hyperthreaded processors, digital signal processors, and microcontrollers.

7. The system of claim 4, wherein the first and second virtual machines comprise guest software, the guest software having one or more of an operating software and a software application.

8. A computer-readable storage medium comprising instructions which, when executed cause a machine to:

gather information relating to a processor, wherein the information comprises processor state information having one or more of characteristics of the processor, history of the processor, characteristics of a first virtual machines, and a second virtual machine, history of the first and second virtual machines, and event monitoring data;

evaluate the information relating to the processor; and manage a first virtual machine and a second virtual machine via the information, the managing of the first and second virtual machines including managing a predetermined processing time allocated to each of the first virtual machine and the second virtual machine, the managing further including dynamically allocating resources including extending, suspending, increasing, or decreasing the predetermined processing time allocated to the first virtual machine and the second virtual machine, wherein dynamically allocating resources further includes switching tasks being performed on the first virtual machine to the second virtual machine when the second virtual machine is determined to be better at performing the tasks than the first virtual machine based on the information, suspending the predetermined processing time allocated to the first virtual machine and extending a predetermined processing time allocated to the second virtual machine by granting the suspended predetermined processing time allocated to the first virtual machine to the second virtual machine, wherein the predetermined processing time is allocated by a central processing unit to perform the tasks.

9. The computer-readable storage medium of claim 8, wherein the instructions which, when executed, further cause the machine to monitor the processor.

10. The computer-readable storage medium of claim 8, wherein the managing of the first and second virtual machines is performed by a virtual machine manager (VMM) comprising a state management unit.

* * * * *